United States Patent
Li et al.

(10) Patent No.: US 10,389,428 B2
(45) Date of Patent: Aug. 20, 2019

(54) TECHNIQUES AND APPARATUSES FOR SWITCHING BETWEEN A SINGLE ANTENNA SUBARRAY OPERATION AND A MULTIPLE ANTENNA SUBARRAY OPERATION FOR DIFFERENT TRAFFIC TYPES

(71) Applicant: QUALCOMM Incorporated, San Diego, CA (US)

(72) Inventors: Junyi Li, Chester, NJ (US); Tao Luo, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 15/647,714

(22) Filed: Jul. 12, 2017

(65) Prior Publication Data
US 2018/0145742 A1    May 24, 2018

Related U.S. Application Data

(60) Provisional application No. 62/425,802, filed on Nov. 23, 2016.

(51) Int. Cl.
*H04B 7/10* (2017.01)
*H04B 7/08* (2006.01)
(Continued)

(52) U.S. Cl.
CPC ......... *H04B 7/0874* (2013.01); *H04B 7/0404* (2013.01); *H04B 7/086* (2013.01); *H04B 7/0617* (2013.01); *H04B 7/0877* (2013.01)

(58) Field of Classification Search
CPC .... H04B 7/0874; H04B 7/0404; H04B 7/086; H04B 7/0617; H04B 7/0877
(Continued)

(56) References Cited

U.S. PATENT DOCUMENTS

2007/0066361 A1 * 3/2007 Knudsen ............... H01Q 3/24
  455/562.1
2013/0222206 A1    8/2013 Park
(Continued)

FOREIGN PATENT DOCUMENTS

EP    2334122 A1    6/2011

OTHER PUBLICATIONS

International Search Report and Written Opinion—PCT/US2017/055593—ISA/EPO—Dec. 22, 2017.

*Primary Examiner* — Zewdu A Kassa
(74) *Attorney, Agent, or Firm* — Harrity & Harrity, LLP

(57) ABSTRACT

A method, an apparatus, and a computer program product for wireless communication are provided. The apparatus may receive an indication of a traffic type, wherein the indication is received via a first radiofrequency (RF) band. The apparatus may configure the apparatus to switch from a first antenna subarray operation that uses a first set of antenna subarrays to a second antenna subarray operation that uses a second set of antenna subarrays based at least in part on receiving the indication of the traffic type, wherein the second antenna subarray operation uses a second RF band for a communication. The apparatus may transmit the communication using the second antenna subarray operation.

30 Claims, 15 Drawing Sheets

(51) Int. Cl.
*H04B 7/0404* (2017.01)
*H04B 7/06* (2006.01)
(58) Field of Classification Search
USPC .......................... 375/347, 346, 316, 295, 219
See application file for complete search history.

(56) References Cited

U.S. PATENT DOCUMENTS

2017/0352953 A1* 12/2017 Petersson ............. H04B 7/0617
2018/0041858 A1*  2/2018 Sheng ................... H04L 1/0009

* cited by examiner

TECHNIQUES AND APPARATUSES FOR SWITCHING BETWEEN A SINGLE ANTENNA SUBARRAY OPERATION AND A MULTIPLE ANTENNA SUBARRAY OPERATION FOR DIFFERENT TRAFFIC TYPES

CROSS-REFERENCE TO RELATED APPLICATIONS UNDER 35 U.S.C. § 119

This application claims priority to U.S. Provisional Patent Application No. 62/425,802, filed on Nov. 23, 2016, entitled "TECHNIQUES AND APPARATUSES FOR SWITCHING BETWEEN A SINGLE ANTENNA SUBARRAY OPERATION AND A MULTIPLE ANTENNA SUBARRAY OPERATION FOR DIFFERENT TRAFFIC TYPES," which is hereby expressly incorporated by reference herein.

INTRODUCTION

Aspects of the present disclosure generally relate to wireless communication, and more particularly to techniques and apparatuses for switching between a single antenna subarray operation and a multiple antenna subarray operation for different traffic types.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different wireless communication devices to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In an aspect of the disclosure, a method, an apparatus, and a computer program product are provided.

In some aspects, the method may include receiving, by a user equipment (UE), an indication of a traffic type, wherein the indication is received via a first radiofrequency (RF) band. The method may include configuring the UE to switch from a first antenna subarray operation that uses a first set of antenna subarrays to a second antenna subarray operation that uses a second set of antenna subarrays based at least in part on receiving the indication of the traffic type, wherein the second antenna subarray operation uses a second RF band for a communication. The method may include transmitting the communication using the second antenna subarray operation.

In some aspects, the apparatus may include a memory and one or more processors operatively coupled to the memory. The memory and the one or more processors may be configured to receive an indication of a traffic type, wherein the indication is received via a first radiofrequency (RF) band. The memory and the one or more processors may be configured to configure the apparatus to switch from a first antenna subarray operation that uses a first set of antenna subarrays to a second antenna subarray operation that uses a second set of antenna subarrays based at least in part on receiving the indication of the traffic type, wherein the second antenna subarray operation uses a second RF band for a communication. The memory and the one or more processors may be configured to transmit the communication using the second antenna subarray operation.

In some aspects, the apparatus may include means for receiving an indication of a traffic type, wherein the indication is received via a first radiofrequency (RF) band. The apparatus may include means for configuring the apparatus to switch from a first antenna subarray operation that uses a first set of antenna subarrays to a second antenna subarray operation that uses a second set of antenna subarrays based at least in part on receiving the indication of the traffic type, wherein the second antenna subarray operation uses a second RF band for a communication. The apparatus may include means for transmitting the communication using the second antenna subarray operation.

In some aspects, the computer program product may include a non-transitory computer-readable medium storing computer executable code. The code may include code for receiving, by a user equipment (UE), an indication of a traffic type, wherein the indication is received via a first radiofrequency (RF) band. The code may include code for configuring the UE to switch from a first antenna subarray operation that uses a first set of antenna subarrays to a second antenna subarray operation that uses a second set of antenna subarrays based at least in part on receiving the indication of the traffic type, wherein the second antenna subarray operation uses a second RF band for a communication. The code may include code for transmitting the communication using the second antenna subarray operation.

Aspects generally include a method, apparatus, system, computer program product, non-transitory computer-readable medium, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
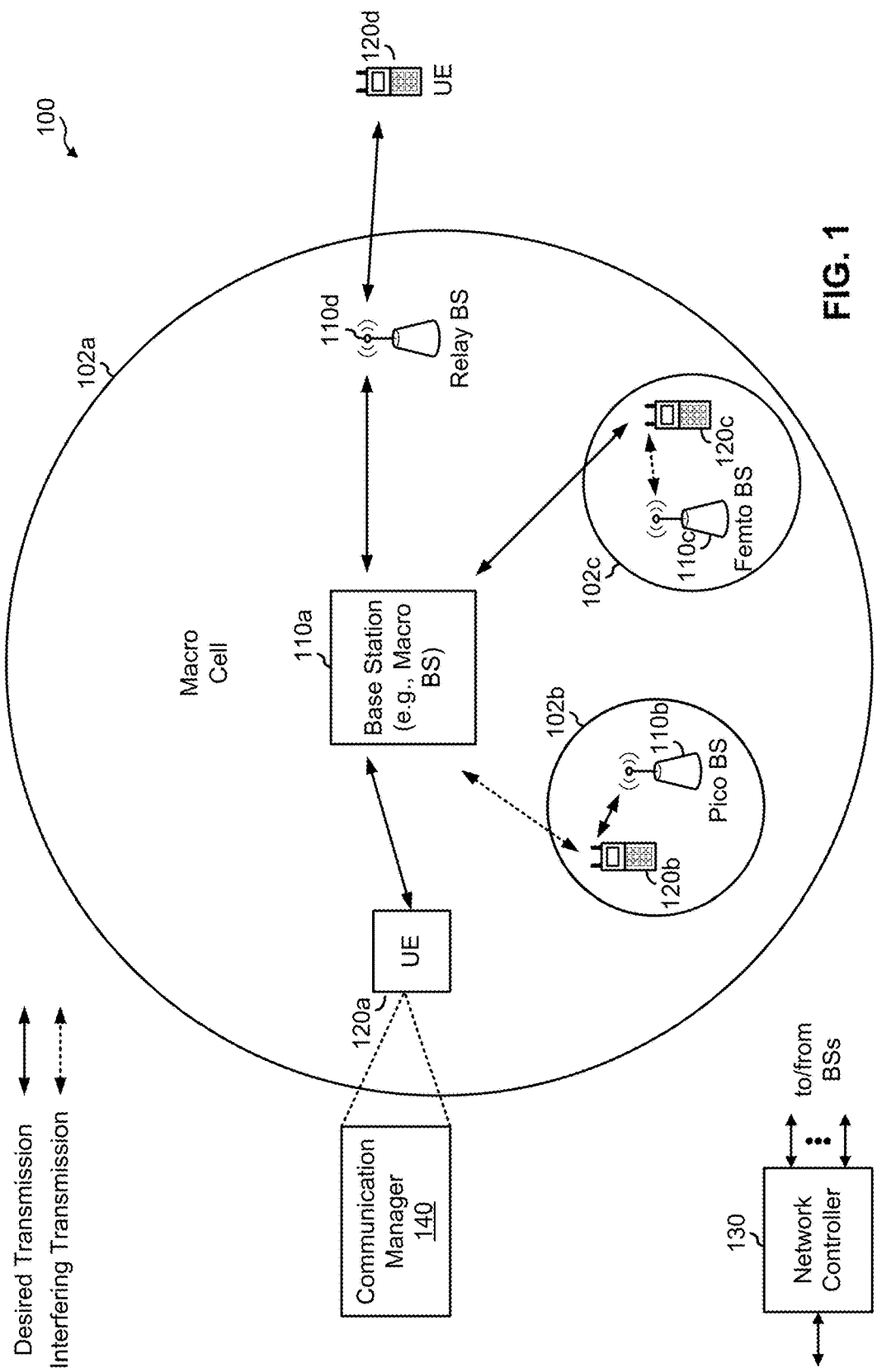
FIG. 1 is diagram illustrating an example of a wireless communication network.

A UE may include multiple antenna subarrays capable of communicating with a base station. An antenna subarray may refer to a set of antennas configured to operate together (e.g., for coherent communication). The multiple antenna subarrays may provide the UE with diversity to transmit and/or receive signals if signals from one or more antenna subarrays are blocked or distorted. For example, the UE may communicate using millimeter wave frequencies, also known as extremely high frequency (EHF), which may be subject to signal blocking more often than lower frequency communications.

In some aspects, this signal blocking may be handled by retransmitting dropped or distorted communications, such as by using a hybrid automatic repeat request (HARQ) operation. However, this retransmission mechanism may be insufficient to handle high priority traffic, such as ultra-reliable low-latency communication (URLLC) traffic. As such, techniques described herein are capable of configuring the UE to switch from a first antenna subarray operation, that uses fewer active antenna subarrays (e.g., one active subarray), to a second antenna subarray operation that uses more active antenna subarrays (e.g., multiple active subarrays) for communication of high priority traffic (e.g., URLLC traffic). In this way, the UE may increase the likelihood of successfully transmitting or receiving the high priority traffic, and may increase the likelihood of complying with traffic requirements of the high priority traffic (e.g., low latency, low jitter, low packet drop rate, etc.). Furthermore, techniques described herein are capable of configuring the UE to switch from a second antenna subarray operation, that uses more active antenna subarrays (e.g., multiple active subarrays), to a first antenna subarray operation that uses fewer active antenna subarrays (e.g., one active subarray) for communication of low priority traffic (e.g., enhanced mobile broadband (eMBB) traffic). In this way, the UE may conserve battery power while still complying with traffic requirements of the low priority traffic.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point ("AP") may comprise, be implemented as, or known as a NodeB, a Radio Network Controller ("RNC"), an eNodeB (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), a Node B (NB), a gNB, a 5G NB, a NR BS, a Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G NB, an access point, a TRP, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

As shown in FIG. 1, UE 120 may include a communication manager 140. As described in more detail elsewhere herein, communication manager 140 may receive an indication of a traffic type via a first radiofrequency (RF) band, may configure the UE 120 to switch from a first antenna subarray operation that uses a first set of antenna subarrays to a second antenna subarray operation that uses a second set of antenna subarrays based at least in part on receiving the indication of the traffic type, wherein the second antenna subarray operation uses a second RF band for a communication, and may transmit the communication using the second antenna subarray operation. Additionally, or alternatively, communication manager 140 may perform one or more other operations described herein. Communication manager 140 may include one or more components of FIG. 2, as described below.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
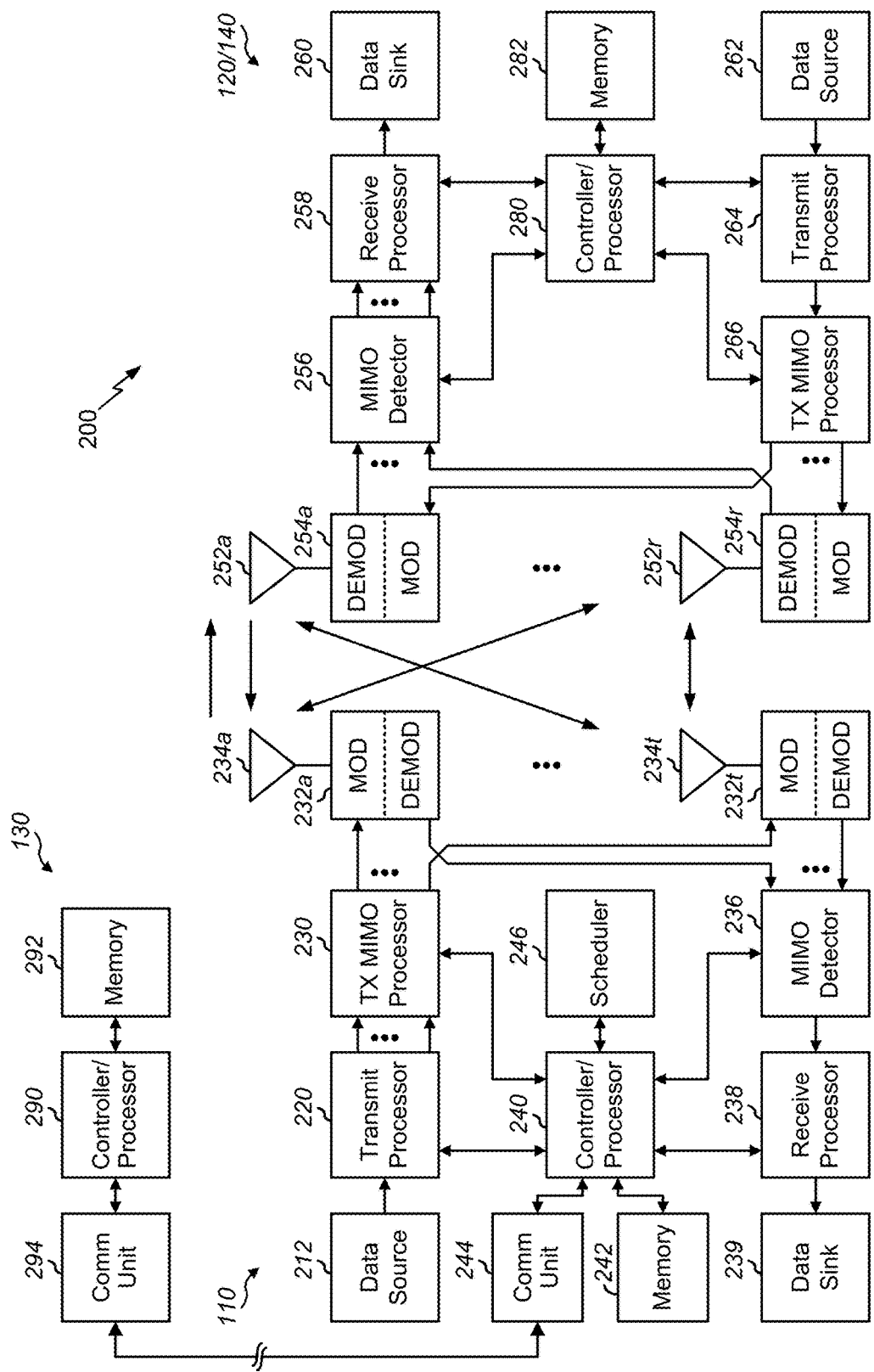
FIG. 2 is a diagram illustrating an example of a base station in communication with a user equipment (UE) in a wireless communication network.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to certain aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at base station 110 and UE 120, respectively, to perform switching between a single antenna subarray operation and a multiple antenna subarray operation for different traffic types. For example, controller/processor 280 and/or other processors and modules at base station 110, may perform or direct operations of UE 120 to perform switching between a single antenna subarray operation and a multiple antenna subarray operation for different traffic types. For example, controller/processor 280 and/or other controllers/processors and modules at BS 110 may perform or direct operations of, for example, method 1100 of FIG. 11, method 1200 of FIG. 12, and/or other processes as described herein. In some aspects, one or more of the components shown in FIG. 2 may be employed to perform example method 1100 of FIG. 11, method 1200 of FIG. 12, and/or other processes for the techniques described herein. Memories 242 and 282 may store data and program codes for BS 110 and UE 120, respectively.

In some aspects, UE 120 may include means for receiving an indication of a traffic type, wherein the indication is received via a first RF band; means for configuring the apparatus to switch from a first antenna subarray operation that uses a first set of antenna subarrays to a second antenna subarray operation that uses a second set of antenna subarrays based at least in part on receiving the indication of the traffic type, wherein the second antenna subarray operation uses a second RF band for a communication; and means for transmitting the communication using the second antenna subarray operation. Additionally, or alternatively, UE 120 may include means for performing other operations described herein. Such means may include one or more components shown in FIG. 2. Additionally, or alternatively, communication manager 140 may include one or more components shown in FIG. 2 (e.g., a memory, one or more processors, and/or the like).

As indicated above, FIG. 2 is provided merely as an example. Other examples are possible and may differ from what was described with regard to FIG. 2.

Figure 3:
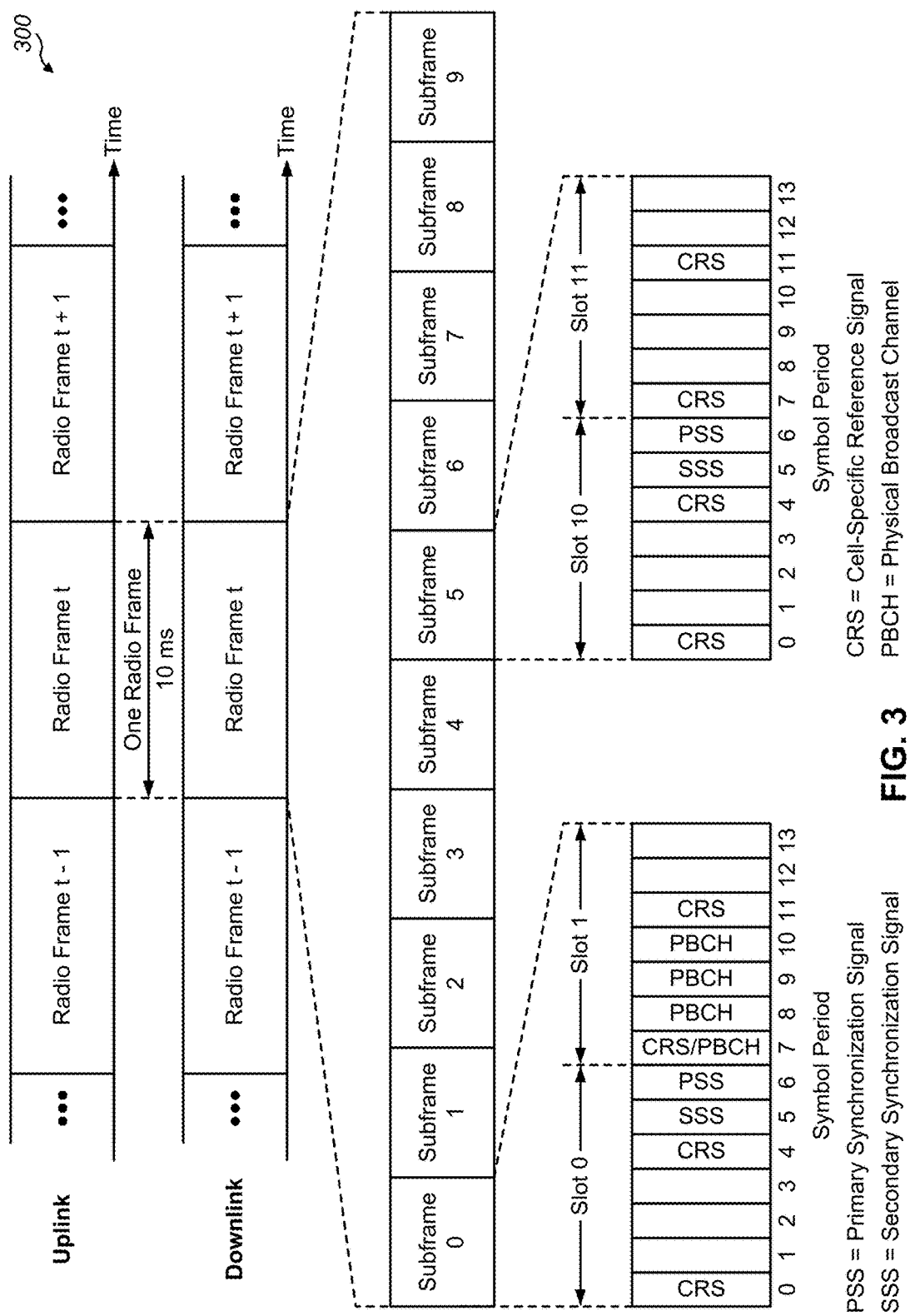
FIG. 3 is a diagram illustrating an example of a frame structure in a wireless communication network.

FIG. 3 shows an example frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
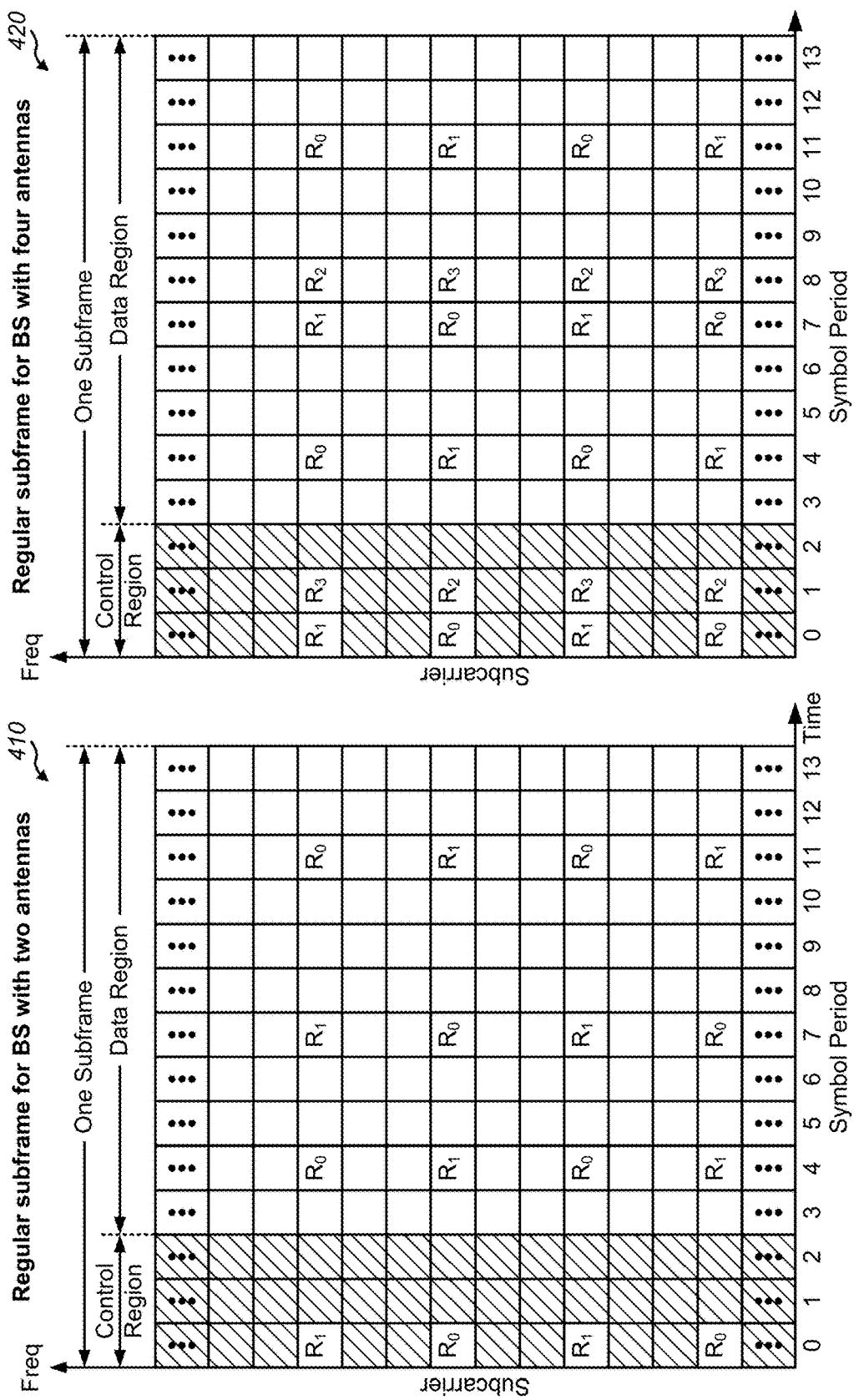
FIG. 4 is a diagram illustrating two example subframe formats with the normal cyclic prefix.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low-latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
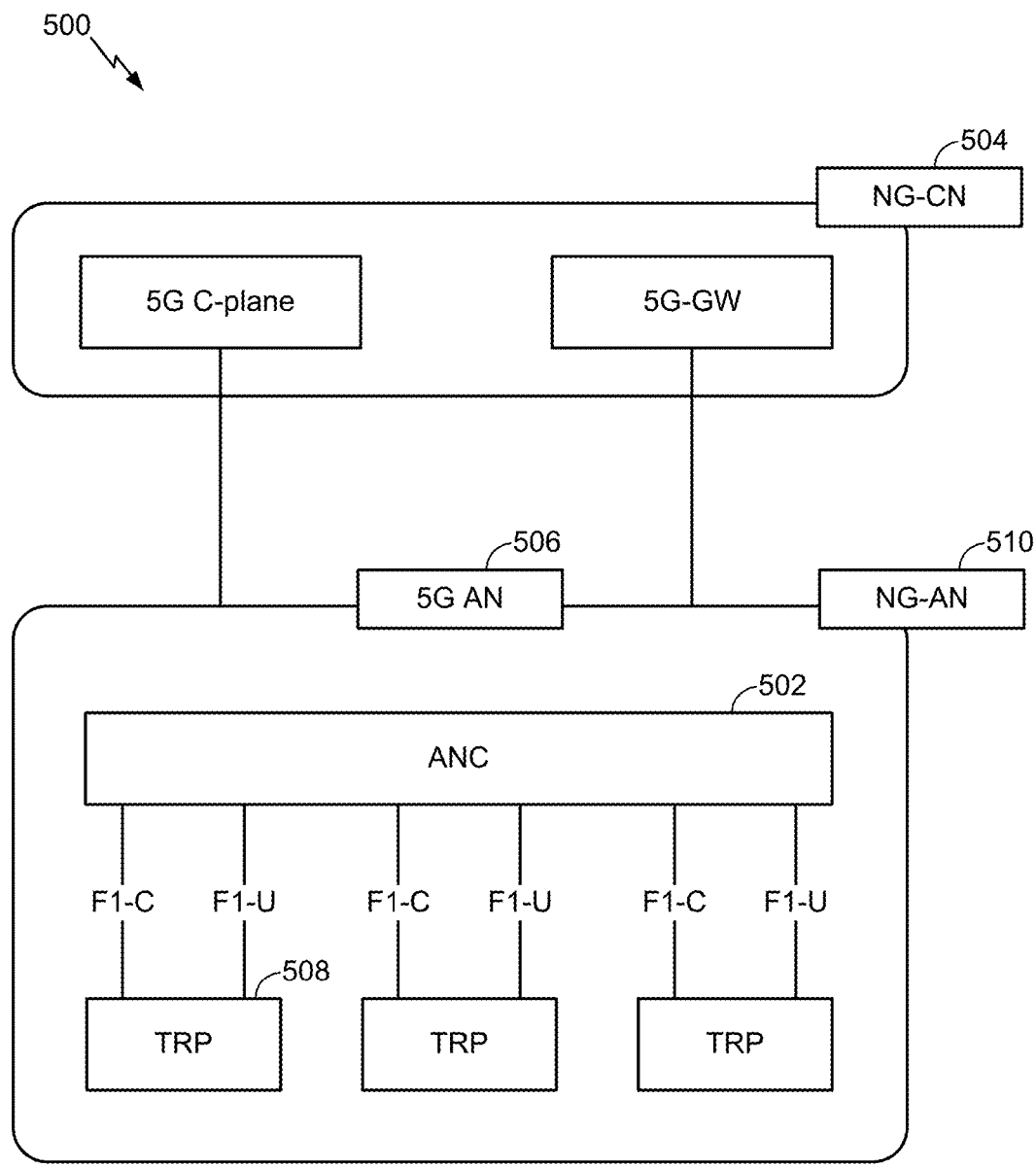
FIG. 5 is a diagram illustrating an example logical architecture of a distributed radio access network (RAN).

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The PDCP, RLC, MAC protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
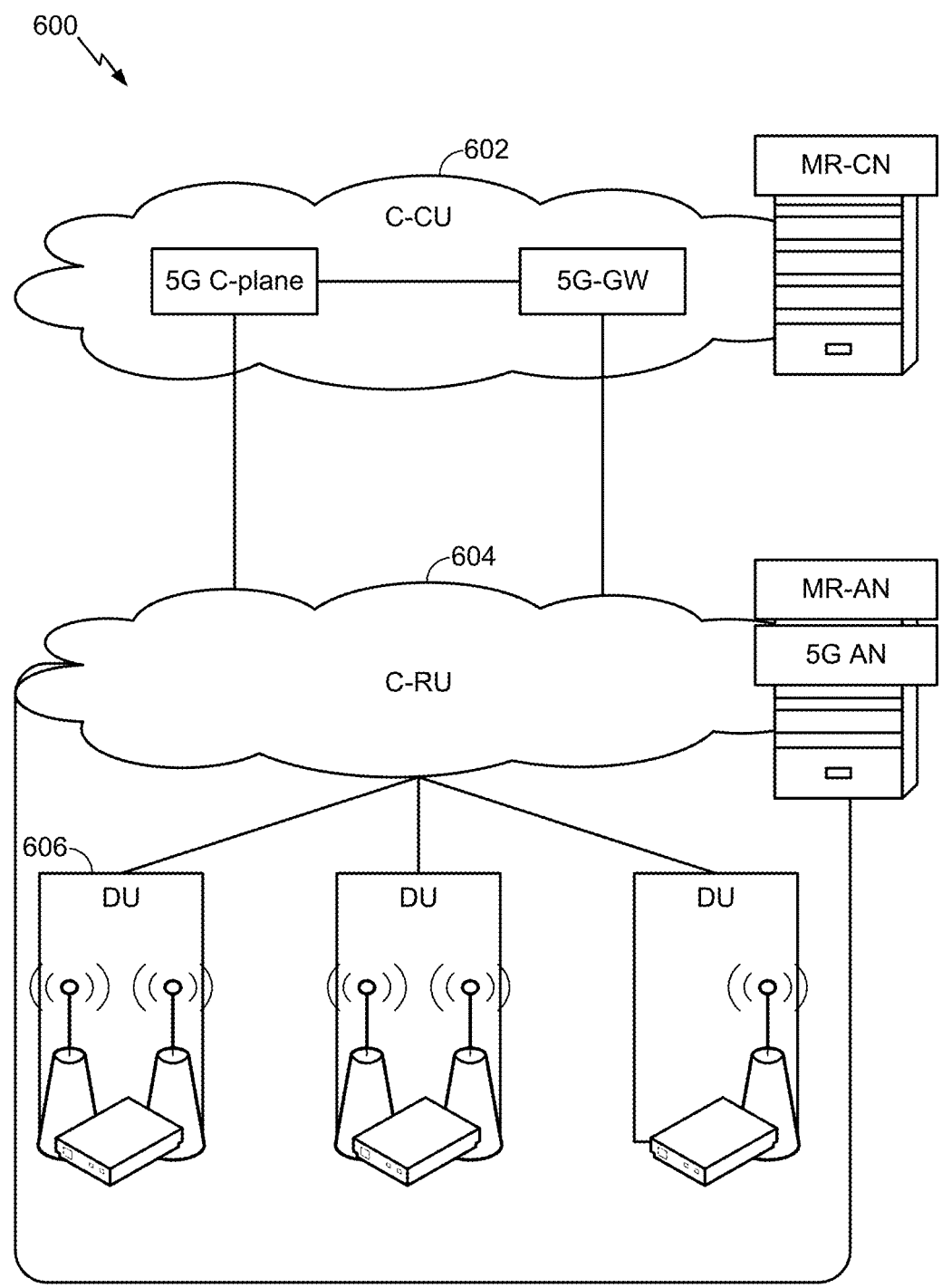
FIG. 6 is a diagram illustrating an example physical architecture of a distributed RAN.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
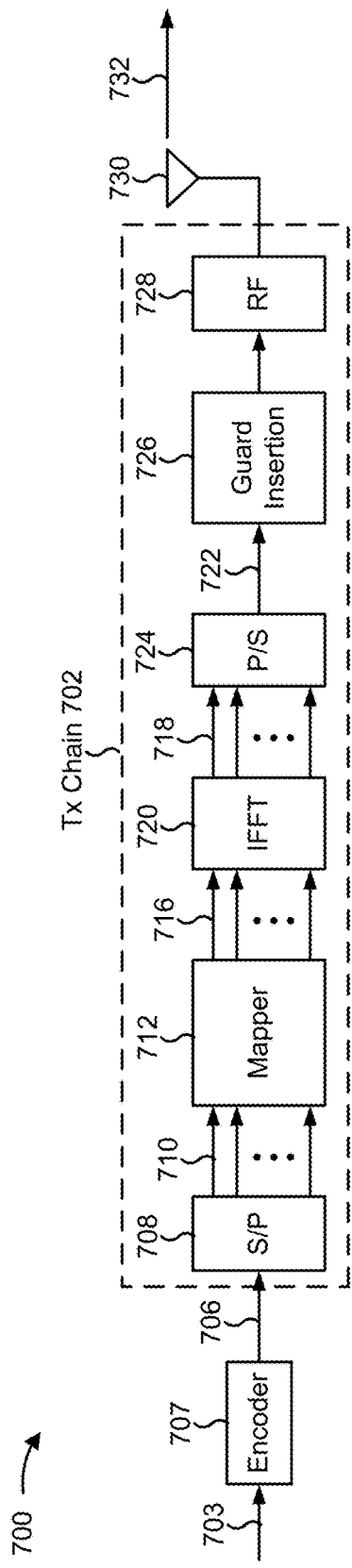
FIGS. 7 and 8 are diagram illustrating an example transmission chain and an example receiver chain in a user equipment.
Figure 8:
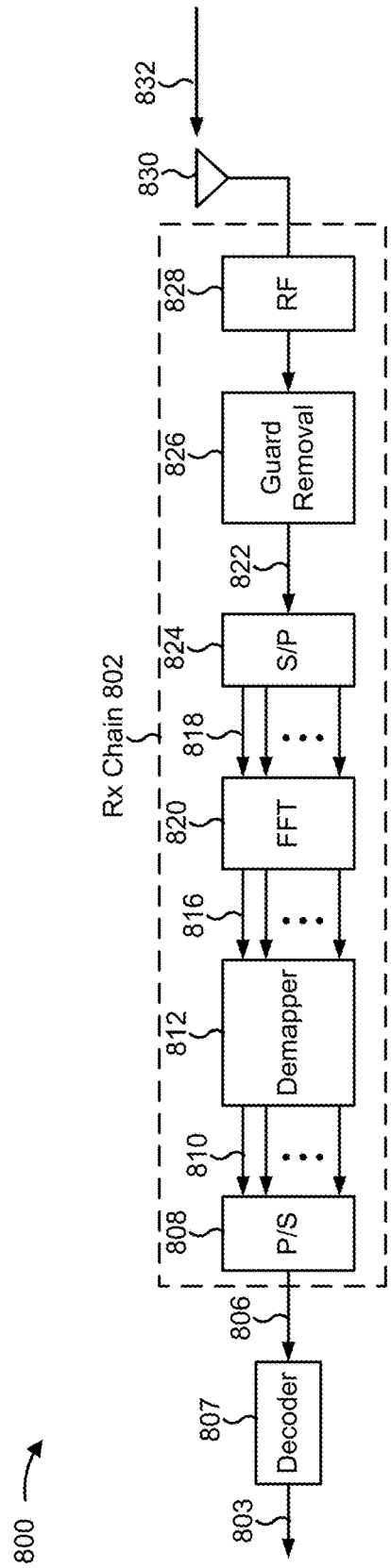

FIGS. 7-8 are diagram illustrating an example 700 of a transmission (Tx) chain 702 and an example 800 of a receiver (Rx) chain 802 of a UE (e.g., the UE 120 of FIG. 1, or the like). In some aspects, some or all of Tx chain 702 may be implemented in the transmit processor 264 of the UE 120, as shown in FIG. 2.

An encoder 707 may alter a signal (e.g., a bitstream) 703 into data 706. Data 706 to be transmitted is provided from encoder 707 as input to a serial-to-parallel (S/P) converter 708. In some aspects, S/P converter 708 may split the transmission data into N parallel data streams 710.

The N parallel data streams 710 may then be provided as input to a mapper 712. Mapper 712 may map the N parallel data streams 710 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), etc. Thus, mapper 712 may output N parallel symbol streams 716, each symbol stream 716 corresponding to one of N orthogonal subcarriers of an inverse fast Fourier transform (IFFT) component 720. These N parallel symbol streams 716 are represented in the frequency domain and may be converted into N parallel time domain sample streams 718 by IFFT component 720.

In some aspects, N parallel modulations in the frequency domain are equal to N modulation symbols in the frequency domain, which are equal to N mapping and N-point IFFT in the frequency domain, which are equal to one (useful) OFDM symbol in the time domain, which are equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 718 may be converted into an OFDM/OFDMA symbol stream 722 by a parallel-to-serial (P/S) converter 724. A guard insertion component 726 may insert a guard interval between successive OFDM/OFDMA symbols in the OFDM/OFDMA symbol stream 722. The output of guard insertion component 726 may then be upconverted to a desired transmit frequency band by a radio frequency (RF) front end 728. An antenna 730 may then transmit the resulting signal 732.

In some aspects, Rx chain 802 may utilize OFDM/OFDMA. In some aspects, some or all of Tx chain 702 may be implemented in the receive processor 258 of the UE 120, as shown in FIG. 2.

As shown Rx chain 802 may receive a signal 832 at antenna 830. When the signal 832 is received by the antenna 830, the received signal 832 may be downconverted to a baseband signal by an RF front end 828. A guard removal component 826 may then remove the guard interval that was inserted between OFDM/OFDMA symbols by guard insertion component 726.

The output of guard removal component 826 may be provided to an S/P converter 824. The output may include an OFDM/OFDMA symbol stream 822, and S/P converter 824 may divide the OFDM/OFDMA symbol stream 822 into N parallel time-domain symbol streams 818, each of which corresponds to one of the N orthogonal subcarriers. A fast Fourier transform (FFT) component 820 may convert the N parallel time-domain symbol streams 818 into the frequency domain and output N parallel frequency-domain symbol streams 816.

A demapper 812 may perform the inverse of the symbol mapping operation that was performed by mapper 712, thereby outputting N parallel data streams 810. A P/S converter 808 may combine the N parallel data streams 810 into a single data stream 806. Ideally, data stream 806 corresponds to data 706 that was provided as input to Tx chain 702. Data stream 806 may be decoded into a decoded data stream 803 by decoder 807.

Techniques described herein relate to switching from a first antenna subarray operation to a second antenna subarray operation by activating and/or deactivating one or more antenna subarrays. In some aspects, an antenna subarray may be activated by activating (e.g., powering on) one or more antenna elements and/or one or more components shown in FIG. 7 and/or FIG. 8. In some aspects, an antenna subarray may be deactivated by deactivating (e.g., powering off) one or more antenna elements and/or one or more components shown in FIG. 7 and/or FIG. 8.

The number and arrangement of components shown in FIG. 7 and FIG. 8 are provided as an example. In practice, there may be additional components, fewer components, different components, or differently arranged components than those shown in FIG. 7 and/or FIG. 8. Furthermore, two or more components shown in FIG. 7 and/or FIG. 8 may be implemented within a single components, or a single components shown in FIG. 7 and/or FIG. 8 may be implemented as multiple, distributed components. Additionally, or alternatively, a set of components (e.g., one or more components) shown in FIG. 7 and/or FIG. 8 may perform one or more functions described as being performed by another set of components shown in FIG. 7 and/or FIG. 8. In some aspects, a plurality of Tx chains and/or a plurality of Rx chains may be employed. In some aspects, two or more of such plurality of Tx or Rx chains may share one or more power amplifiers.

A UE may include multiple antenna subarrays capable of communicating with a base station. An antenna subarray may refer to a set of antennas configured to operate together (e.g., for coherent communication). The multiple antenna subarrays may provide the UE with diversity to transmit and/or receive signals if signals from one or more antenna subarrays are blocked or distorted. For example, the UE may communicate using millimeter wave frequencies, also known as extremely high frequency (EHF), which may be subject to signal blocking more often than lower frequency communications.

In some aspects, this signal blocking may be handled by retransmitting dropped or distorted communications, such as by using a hybrid automatic repeat request (HARQ) operation. However, this retransmission mechanism may be insufficient to handle high priority traffic, such as ultra-reliable low-latency communication (URLLC) traffic. As such, techniques described herein are capable of configuring the UE to switch from a first antenna subarray operation, that uses fewer active antenna subarrays (e.g., one active subarray), to a second antenna subarray operation that uses more active antenna subarrays (e.g., multiple active subarrays) for communication of high priority traffic (e.g., URLLC traffic). In this way, the UE may increase the likelihood of successfully transmitting or receiving the high priority traffic, and may increase the likelihood of complying with traffic requirements of the high priority traffic (e.g., low latency, low jitter, low packet drop rate, etc.). Furthermore, techniques described herein are capable of configuring the UE to switch from a second antenna subarray operation, that uses more active antenna subarrays (e.g., multiple active subarrays), to a first antenna subarray operation that uses fewer active antenna subarrays (e.g., one active subarray) for communication of low priority traffic (e.g., enhanced mobile broadband (eMBB) traffic). In this way, the UE may conserve battery power while still complying with traffic requirements of the low priority traffic.

Figure 9A:
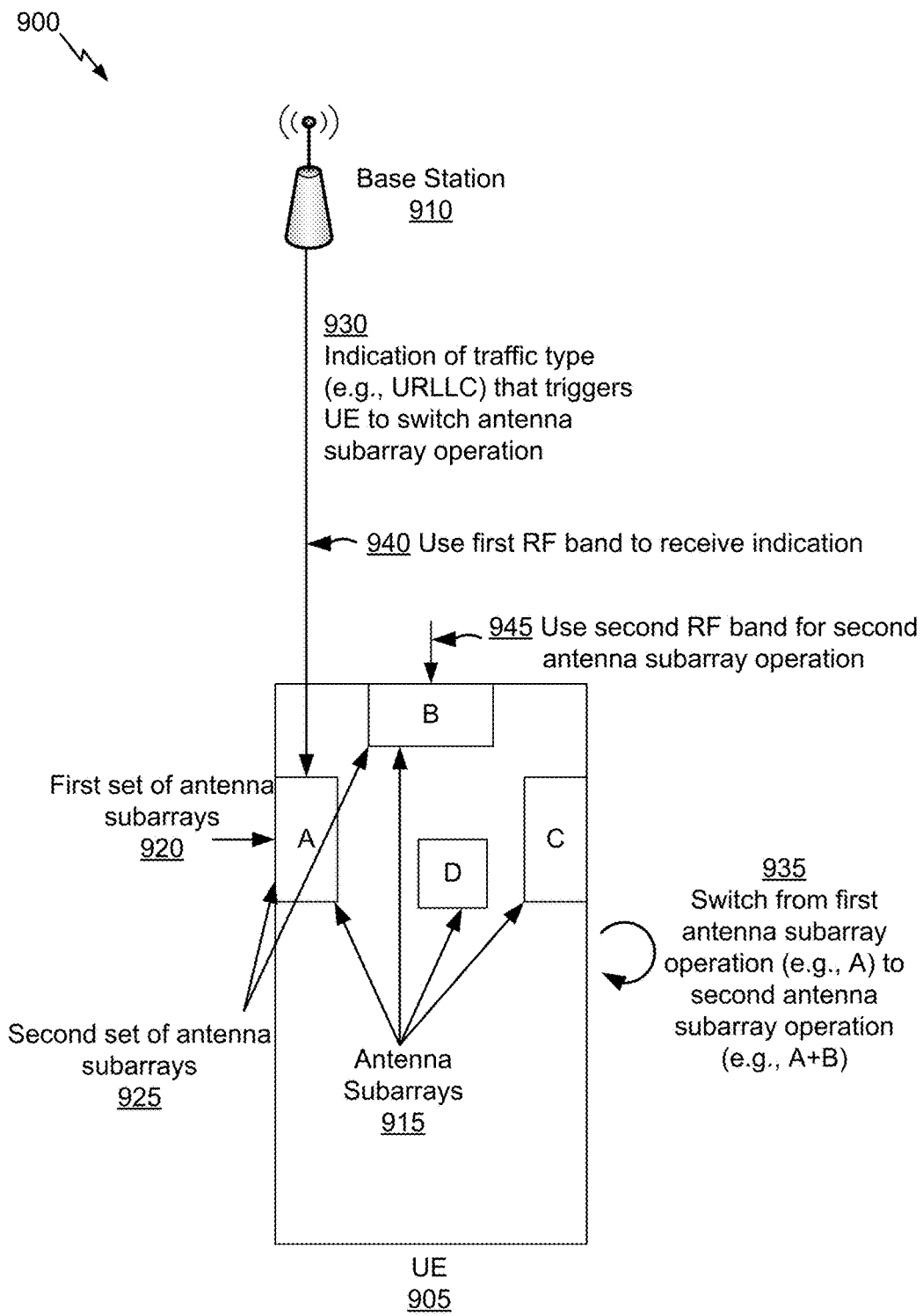
FIGS. 9A-9C are diagrams illustrating an example of switching between a single antenna subarray operation and a multiple antenna subarray operation for different traffic types.
Figure 9B:
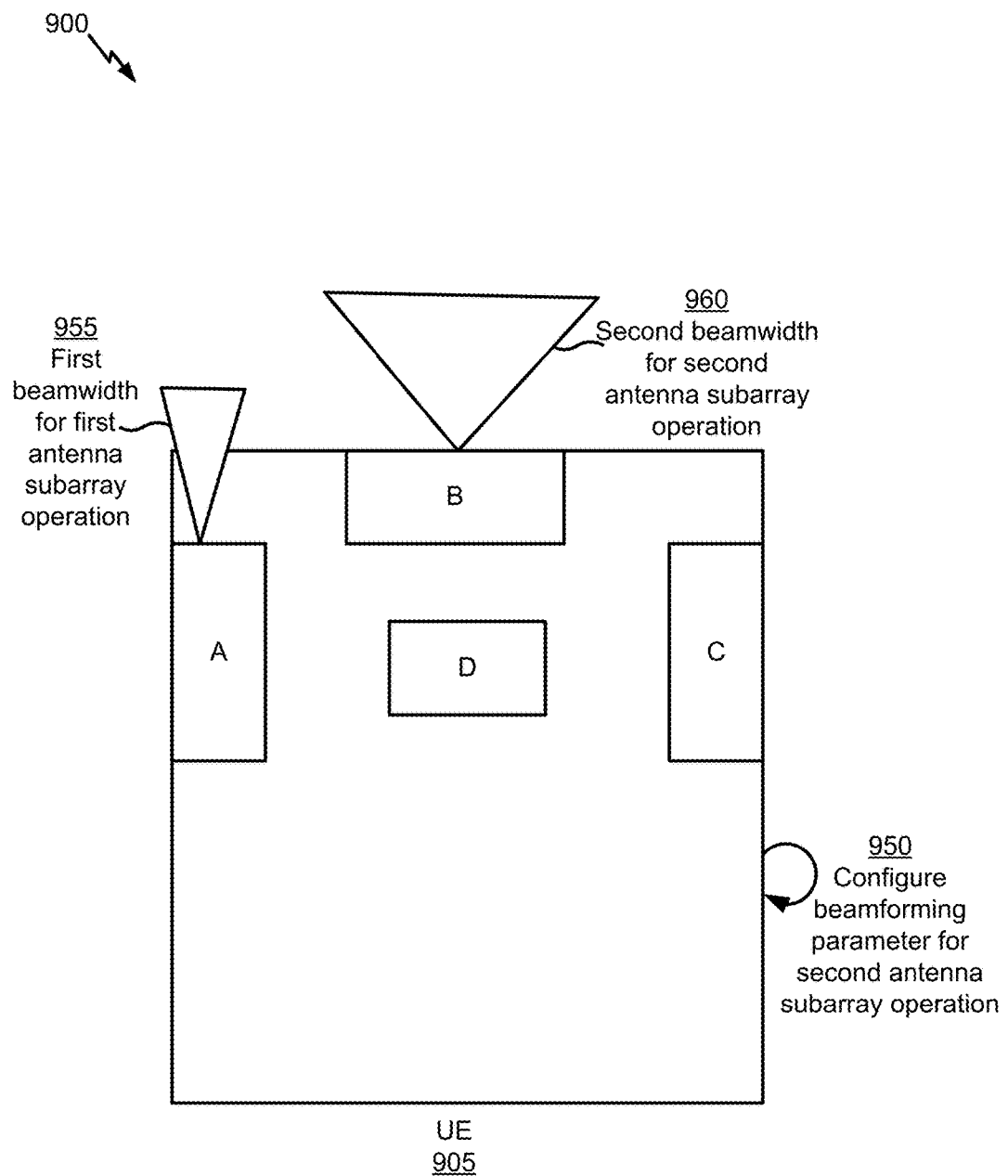
Figure 9C:
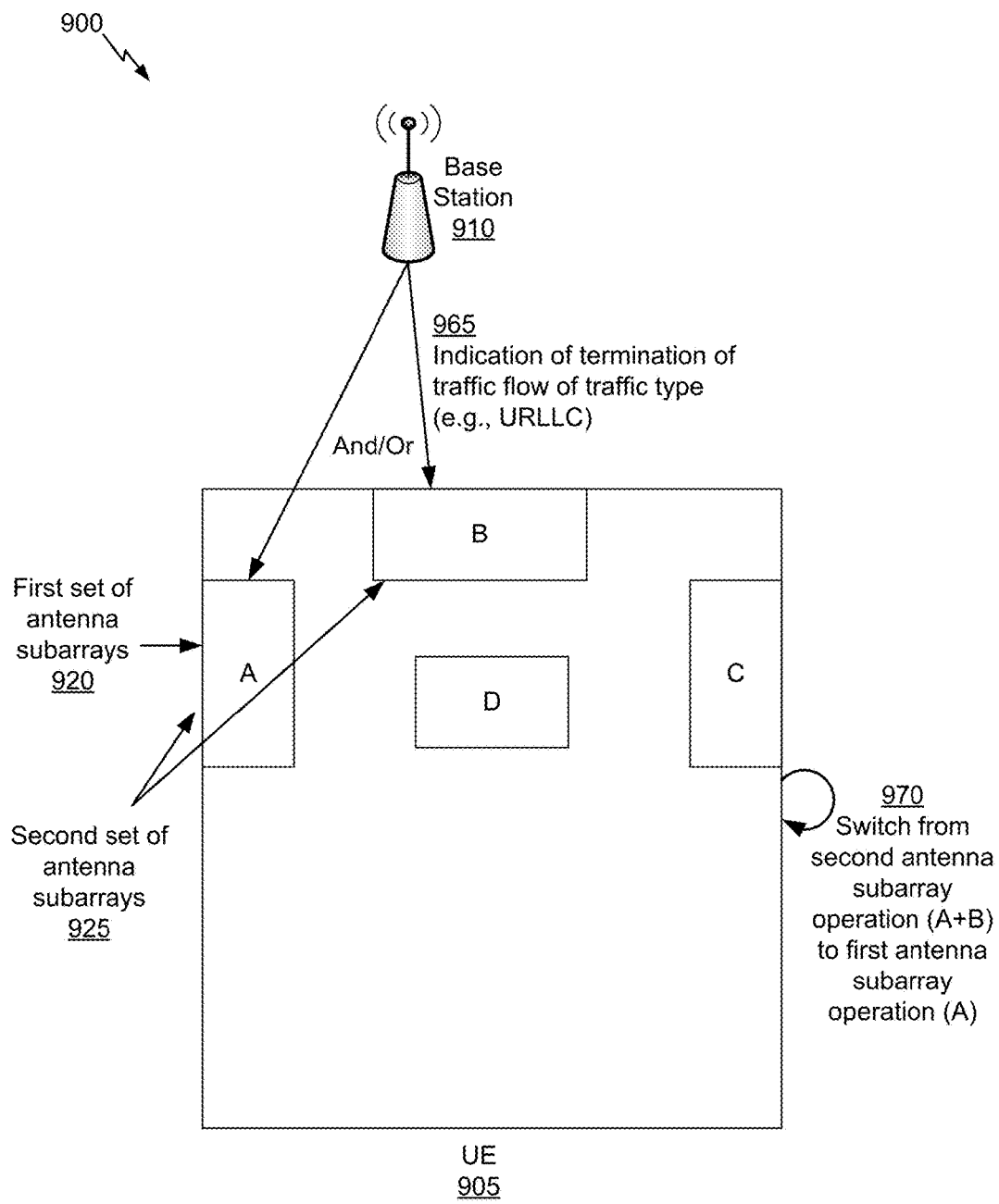

FIGS. 9A-9C are diagrams illustrating an example 900 of switching between a single antenna subarray operation and a multiple antenna subarray operation for different traffic types. As shown in FIG. 9A, a UE 905 (e.g., the UE 120 of FIG. 1, or the like) may communicate with a base station 910 (e.g., the base station 110 of FIG. 1, or the like). The UE 905 may include multiple antenna subarrays 915. An antenna subarray 915 may include multiple antenna elements that are configured to operate together (e.g., coherently). The multiple antenna subarrays 915 of the UE 905 may, as a whole, form an antenna array of the UE 905.

Techniques described herein permit the UE 905 to switch from a first antenna subarray operation that uses a first set of antenna subarrays 920 to a second antenna operation that uses a second set of antenna subarrays 925. As an example, and as shown in FIG. 9A, the first set of antenna subarrays 920 may include a single antenna subarray, shown as subarray A, and the second set of antenna subarrays 925 may include multiple (e.g., two) antenna subarrays, shown as subarrays A and B. The UE 905 may switch from the first antenna subarray operation (e.g., with one active antenna subarray) to the second antenna subarray operation (e.g., with two active antenna subarrays) to handle high priority traffic (e.g., to satisfy one or more traffic requirements of the high priority traffic).

For example, as shown by reference number 930, the UE 905 may receive, from the base station 910, an indication of a traffic type that triggers the UE 905 to switch from the first antenna subarray operation to the second antenna subarray operation. In some aspects, the traffic type that triggers the switch may be associated with a first traffic requirement that has comparatively different strictness (e.g., is more strict, is less strict, etc.) than a second traffic requirement associated with another traffic type associated with the first antenna subarray operation. For example, the first antenna subarray operation may be associated with eMBB traffic (e.g., which may have a less strict traffic requirement), and/or the second subarray operation may be associated with URLLC traffic (e.g., which may have a more strict traffic requirements). Thus, in some aspects, the traffic type that triggers the switch may be URLLC traffic. Examples of URLLC traffic include network traffic with strict traffic requirements (e.g., lower latency, higher reliability, lower mobility interruption, a higher quality of service, etc. than, for example, eMBB traffic), network traffic used for drone communications, network traffic used for vehicle communications (e.g., vehicle-to-vehicle, vehicle-to-infrastructure, vehicle-to-grid, vehicle-to-everything, etc.), device-centric traffic, and/or the like. Examples of eMBB traffic include human-centric traffic, such as multimedia content, messaging services, voice calls, and/or the like.

In some aspects, the indication received from the base station 910 may include a control message instructing the UE 905 to switch from the first antenna subarray operation to the second antenna subarray operation. For example, the base station 910 may receive a message from an originating device (e.g., another UE, a network device, and/or the like) indicating that the originating device has URLLC traffic to be transmitted to the UE 905. Based at least in part on receiving this message, the base station 910 may generate the indication that includes the control message instructing the UE 905 to switch from the first antenna subarray operation to the second antenna subarray operation.

As shown by reference number 935, based at least in part on receiving the indication, the UE 905 may switch from the first antenna subarray operation (e.g., in which antenna subarray A is active) to the second antenna subarray operation (e.g., in which antenna subarray A and antenna subarray B are active). For example, the UE 905 may activate an additional antenna subarray 915, thereby reducing latency, improving reliability, reducing mobility interruptions, and/or complying with one or more other traffic requirements of the URLLC traffic.

In some aspects, the first set of antenna subarrays 920 is a subset of the second set of antenna subarrays 925. For example, as shown, the UE 905 may switch from a first set of antenna subarrays 920 that includes a first antenna subarray 915, shown as subarray A, to a second set of antenna subarrays 925 that includes subarray A and a second antenna subarray 915, shown as subarray B. In this way, the UE 905 may reduce an amount of time to switch to the second antenna subarray operation by activating an antenna subarray 915 (e.g., subarray B) and maintaining an already active antenna subarray 915 (e.g., subarray A), rather than deactivating an active antenna subarray 915 and activating one or more other antenna subarrays 915.

While not shown, in some aspects, the first set of antenna subarrays 920 may not be a subset of the second set of antenna subarrays 925. For example, the UE 905 may switch from a first set of antenna subarrays 920 that includes a first antenna subarray 915, such as subarray A, to a second set of antenna subarrays 925 that does not include subarray A, such as subarray B and subarray C. This may improve handling of network traffic by the UE 905 when, for example, subarray A is blocked, is experiencing poor channel conditions, and/or the like.

Although FIG. 9A shows the first set of antenna subarrays 920 as including a single antenna subarray 915 (e.g., subarray A), in some aspects, the first set of antenna subarrays 920 may include multiple antenna subarrays 915. In this case, the UE 905 may switch from the first antenna subarray operation to the second antenna subarray operation by, for example, switching from two active antenna subarrays 915 to three active antenna subarrays 915, switching from three active antenna subarrays 915 to four active antenna subarrays 915, and/or the like. Furthermore, while FIG. 9A shows the second set of antenna subarrays 925 as including one more active antenna subarray 915 than the first set of antenna subarrays 920, in some aspects, the second set of antenna subarrays 925 may include two more active antenna subarrays 915 than the first set of antenna subarrays 920, may include three more active antenna subarrays 915 than the first set of antenna subarrays 920, and/or the like. In some aspects, the second set of antenna subarrays 925 may include the same number of active antenna subarrays 915 as the first set of antenna subarrays 920. In this case, the second set of antenna subarrays 925 may include a different combination of active antenna subarrays 915 than the first set of antenna subarrays 920.

As shown by reference number 940, in some aspects, the UE 905 may use a first radiofrequency (RF) band to receive the indication of the traffic type from the base station 910. As shown by reference number 945, in some aspects, the UE 905 may use a second RF band for a communication of the second antenna subarray operation. In some aspects, the UE 905 may transmit the communication using the second antenna subarray operation. For example, the UE may transmit the communication using one or more antenna subarrays that are active for the second antenna subarray operation. Additionally, or alternatively, the UE may transmit the communication via the second RF band.

In some aspects, the first RF band and the second RF band may be the same RF band. For example, the UE 905 may use a millimeter wave band as the first RF band used to receive the indication, and may also use the millimeter wave band as the second RF band used to transmit a communication when the UE 905 is configured with the second antenna subarray operation. The millimeter wave band may include, for example, a band in the electromagnetic spectrum from approximately 30 GHz to approximately 300 GHz. The radio waves in this band may have a wavelength from approximately one millimeter to approximately ten millimeters. If the UE 905 uses the same RF band for receiving the indication as is used for communications in the first antenna subarray operation and/or the second antenna subarray operation, the UE 905 may reduce receiver complexity, thereby conserving computing resources (e.g., battery power, processing resources, memory resources, and/or the like).

In some aspects, the first RF band and the second RF band may be different RF bands. For example, the UE 905 may use a sub-6 GHz band as the first RF band used to receive the indication, and may use the millimeter wave band as the second RF band used to transmit a communication when the UE 905 is configured with the second antenna subarray operation. The sub-6 GHz band may refer to, for example, bands in the electromagnetic spectrum of less than 6 GHz. In some cases, if the UE 905 uses the millimeter wave band to communicate in the first antenna subarray operation and/or the second antenna subarray operation, communications may be lost due to the nature of millimeter waves. In this case, the base station 910 may transmit the indication to switch from the first antenna subarray operation to the second antenna subarray operation using the sub-6 GHz band, which is less susceptible to blocked and/or distorted communications than the millimeter wave band. Thus, the UE 905 may be more likely to receive the indication, particularly if the millimeter wave band being used by the UE 905 is blocked. In this case, the UE 905 may receive the indication, and may switch to the second antenna subarray operation, which may activate one or more antenna subarrays that are not blocked.

In some aspects, the first RF band and the second RF band may be overlapping RF band. For example, the UE 905 and/or the base station 910 may be configured to use overlapping RF bands for the first RF band and the second RF band as a tradeoff between complexity, as described above in connection with using the same RF band, and increased likelihood of a successful communication, as described above in connection with using different RF bands.

In some aspects, when configuring the second antenna subarray operation, the UE 905 may configure a beamforming parameter, as described below in connection with FIG. 9B. Furthermore, while FIG. 9A shows a first antenna subarray operation that uses a smaller number of antenna subarrays 915 for low priority traffic (e.g., eMBB traffic) and a second antenna subarray operation that uses a larger number of antenna subarrays 915 for high priority traffic (e.g., URLLC traffic), in some aspects, the first antenna subarray operation may use a larger number of antenna subarrays 915 for high priority traffic, and the second antenna subarray operation may use a smaller number of antenna subarrays 915 for low priority traffic. For example, the UE 905 may receive an indication that identifies low priority traffic (e.g., eMBB traffic), and may switch from a first antenna subarray operation with a larger number of antenna subarrays 915 to a second antenna subarray operation with a smaller number of antenna subarrays 915, as described below in connection with FIG. 9C.

As shown in FIG. 9B, and by reference number 950, the UE 905 may configure a beamforming parameter for the second antenna subarray operation. For example, the UE 905 may be configured to use a first beamforming parameter for the first set of antenna subarrays 920 when configured with the first antenna subarray operation. When configuring the second antenna subarray operation, the UE 905 may configure a second beamforming parameter of the second set of antenna subarrays 925 for the second antenna subarray operation.

In some aspects, the beamforming parameter may control a beamwidth of an antenna beam formed by an antenna subarray 915. For example, as shown by reference number 955, the UE 905 may be configured with a first (e.g., narrow, narrower than for the second antenna subarray operation, and/or the like) beamwidth for the first antenna subarray operation. As shown by reference number 960, the UE 905 may configure a second (e.g., wide, wider than for the first antenna subarray operation, and/or the like) beamwidth for the second antenna subarray operation. Thus, as shown, the second beamforming parameter may cause a second beamwidth that is wider than the first beamwidth caused by the first beamforming parameter. In this way, the UE 905 may increase the likelihood of successfully transmitting or receiving the high priority traffic in the second antenna subarray operation, and may increase the likelihood of complying with traffic requirements of the high priority traffic (e.g., low latency, low jitter, low packet drop rate, etc.).

In some aspects, the second beamforming parameter may cause a pseudo-omnidirectional antenna pattern to be formed for the second antenna subarray operation. A pseudo-omnidirectional antenna pattern may refer to an antenna pattern that radiates radio wave power approximately uniformly in all directions in one plane, with the radiated power decreasing with an elevation angle above or below the plane, and dropping to zero on the antenna's axis. Thus, the pseudo-omnidirectional antenna pattern may maximize a likelihood that the high priority traffic is successfully transmitted and/or received by the UE 905.

As shown in FIG. 9C, and by reference number 965, the UE 905 may receive, from the base station 910, an indication of a termination of a traffic flow, associated with a traffic type, that triggers the UE 905 to switch from the second antenna subarray operation to the first antenna subarray operation. For example, the termination of the traffic flow of the traffic type may be a termination of a traffic flow of URLLC traffic and/or other high priority traffic, as described above in connection with FIG. 9A.

In some aspects, the indication received from the base station 910 may include a control message instructing the UE 905 to switch from the second antenna subarray operation to the first antenna subarray operation. For example, the base station 910 may receive an indication that transmission of a URLLC traffic flow has been terminated. Based at least in part on receiving this message, the base station 910 may generate the indication that includes the control message instructing the UE 905 to switch from the second antenna subarray operation to the first antenna subarray operation.

As shown by reference number 970, based at least in part on receiving the indication, the UE 905 may switch from the second antenna subarray operation (e.g., in which antenna subarray A and antenna subarray B are active) to the first antenna subarray operation (e.g., in which antenna subarray A is active, and antenna subarray B is not active). For example, the UE 905 may deactivate an antenna subarray 915, thereby conserving battery power while still complying with one or more traffic requirements of low priority traffic (e.g., eMBB traffic), which may be received by the UE 905 after the traffic flow of the high priority traffic is terminated.

As indicated above, FIGS. 9A-9C are provided as examples. Other examples are possible and may differ from what was described with respect to FIGS. 9A-9C.

Figure 10:
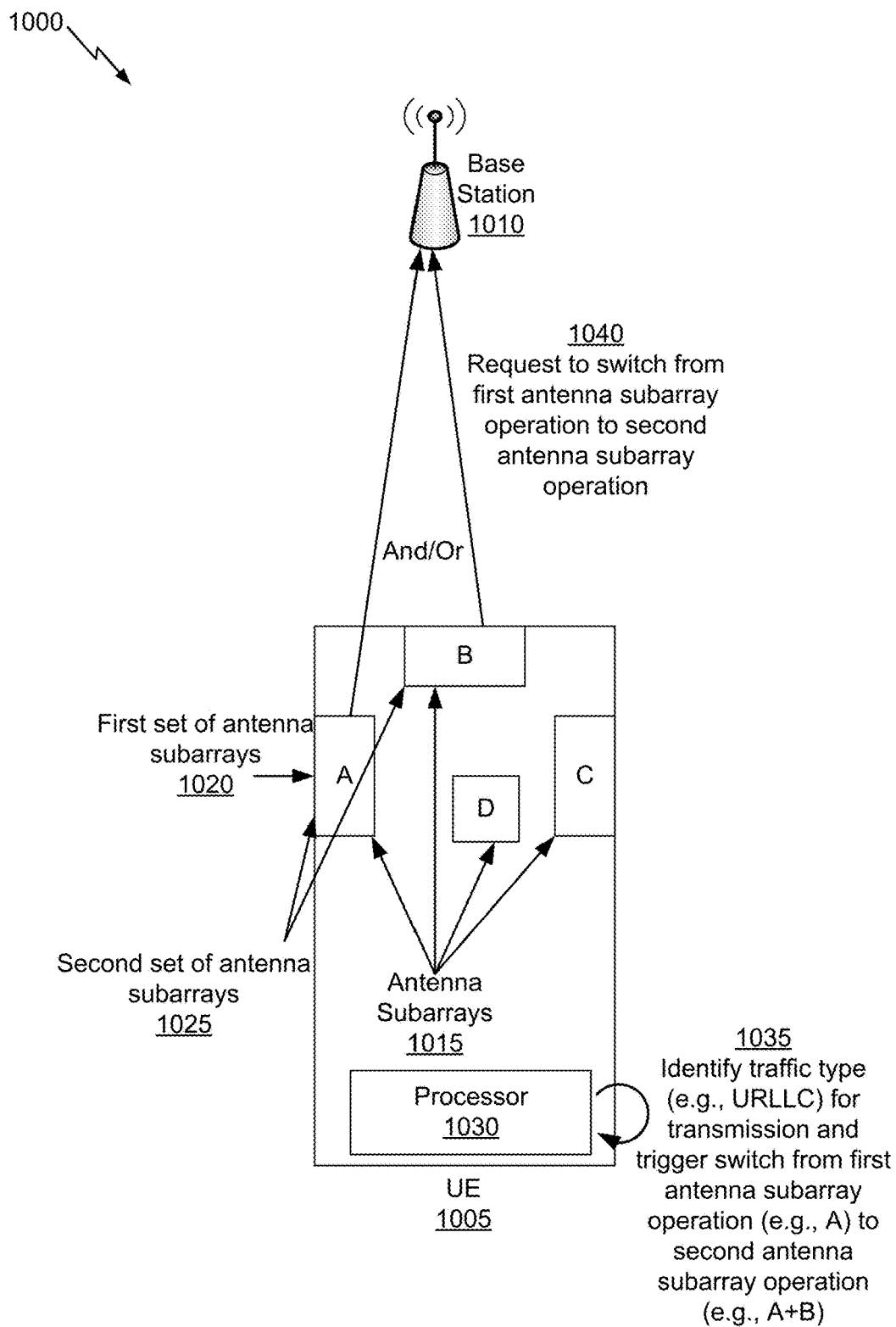
FIG. 10 is a diagram illustrating another example of switching between a single antenna subarray operation and a multiple antenna subarray operation for different traffic types.

FIG. 10 is a diagram illustrating another example of switching between a single antenna subarray operation and a multiple antenna subarray operation for different traffic types.

As shown in FIG. 10, a UE 1005 (e.g., the UE 120 of FIG. 1, the UE 905 of FIGS. 9A-9C, and/or the like) may communicate with a base station 1010 (e.g., the base station 110 of FIG. 1, the base station 910 of FIGS. 9A-9C, and/or the like). In a similar manner as described above in connection with FIG. 9A, the UE 1005 may include multiple antenna subarrays 1015, and may switch from a first antenna subarray operation that uses a first set of antenna subarrays 1020 to a second antenna subarray operation that uses a second set of antenna subarrays 1025. As further shown, the UE 1005 may include a processor 1030 (e.g., controller/processor 280 of FIG. 2, an application processor, and/or the like).

As shown by reference number 1035, the UE 1005 (e.g., the processor 1030) may identify a traffic type that triggers the UE 1005 to switch from the first antenna subarray operation to the second antenna subarray operation. For example, the UE 1005 may identify the traffic type in uplink traffic to be transmitted to the base station 1010. In some aspects, the traffic type that triggers the switch may be associated with a first traffic requirement that has comparatively different strictness than a second traffic requirement associated with another traffic type associated with the first antenna subarray operation, as described above in connection with FIG. 9A. For example, the first antenna subarray operation may be associated with eMBB traffic, and/or the second subarray operation may be associated with URLLC traffic. The URLLC traffic may be associated with a first traffic requirement that is comparatively stricter than a second traffic requirement associated with the eMBB traffic. Based at least in part on identifying the traffic type, the UE 1005 may switch from the first antenna subarray operation to the second antenna subarray operation, as described elsewhere herein. Additionally, or alternatively, the UE 1005 may request the switch (e.g., by sending a request to the base station 1010), and may configure the switch based at least in part on receiving, from the base station 110, a response to the request (e.g., granting or denying the request).

As shown by reference number 1040, based at least in part on identifying the traffic type, the UE 1005 may transmit, to the base station 110, a request to switch from the first antenna subarray operation (e.g., in which antenna subarray A is active) to the second antenna subarray operation (e.g., in which antenna subarray A and antenna subarray B are active). Based at least in part on the request, the base station 110 may be configured, for example, to communicate with the UE 1005 using the second antenna subarray operation (e.g., using the second set of antenna subarrays 1025).

In some aspects, the UE 1005 may transmit the request using the first antenna subarray operation (e.g., before switching to the second antenna subarray operation). For example, the UE 1005 may transmit the request using the first set of antenna subarrays 1020. This may increase a likelihood that the base station 1010 receives the request because the base station 1010 is already configured to communicate with the UE 1005 using the first antenna subarray operation. Furthermore, this may prevent the UE 1005 from wasting computing resources to switch from the first antenna subarray operation to the second antenna subarray operation if the base station 1010 denies the request.

In some aspects, the UE 1005 may transmit the request using the second antenna subarray operation (e.g., prior to switching to the second antenna subarray operation). For example, the UE 1005 may transmit the request using the second set of antenna subarrays 1025. This may assist the base station 1010 with proper configuration of the base station 1010 to communicate with the UE 1005 using the second antenna subarray operation. Furthermore, this may reduce an amount of time for the UE 1005 to switch from the first antenna subarray operation to the second antenna subarray operation (e.g., because the UE 1005 switches to the second antenna subarray operation before transmitting the request), thereby reducing latency, improving reliability, reducing mobility interruptions, and/or complying with one or more other traffic requirements of the URLLC traffic or other high priority traffic.

As indicated above, FIG. 10 is provided as an example. Other examples are possible and may differ from what was described with respect to FIG. 10.

Figure 11:
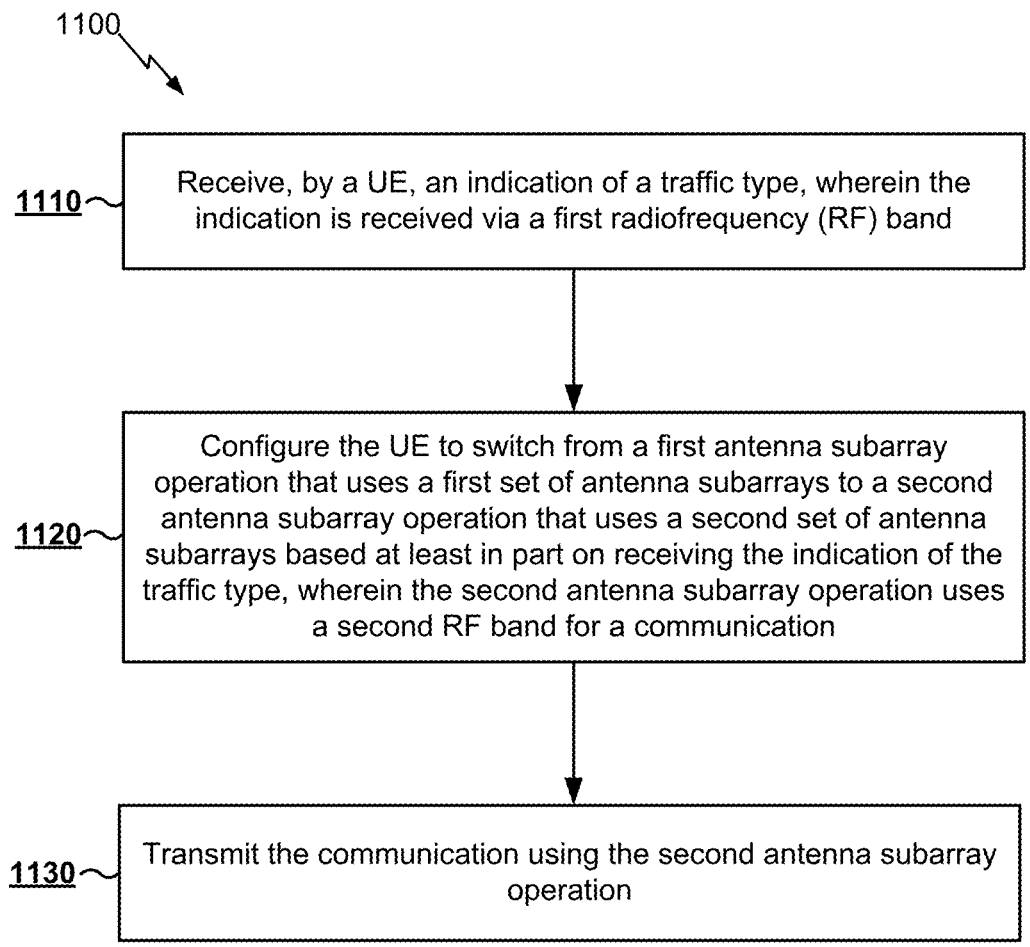
FIG. 11 is a flow chart of a method of wireless communication.

FIG. 11 is a flow chart of a method 1100 of wireless communication. The method may be performed by a UE (e.g., the UE 120 of FIG. 1, the UE 905 of FIGS. 9A-9C, the UE 1005 of FIG. 10, the apparatus 1302/1302', and/or the like).

At 1110, the UE may receive an indication of a traffic type, wherein the indication is received via a first radiofrequency (RF) band. For example, the UE may receive, via a first RF band, an indication of a traffic type. In some aspects, the UE may receive the indication from a base station. Additionally, or alternatively, the indication may include a control message instructing the UE to switch from the first antenna subarray operation to the second antenna subarray operation.

In some aspects, the UE may receive the indication from a processor of the UE, and may transmit, to a base station, a request to switch from the first antenna subarray operation to the second antenna subarray operation. In some aspects, the request is transmitted using the first antenna subarray operation. In some aspects, the request is transmitted using the second antenna subarray operation.

In some aspects, the traffic type that triggers the second antenna subarray operation is associated with a first traffic requirement that has comparatively different strictness than (e.g., is stricter than, is less strict than, etc.) a second traffic requirement associated with another traffic type associated with the first antenna subarray operation. In some aspects, the traffic type is URLLC traffic, and the first traffic requirement is comparatively stricter than the second traffic requirement. In some aspects, the traffic type is eMBB traffic, and the first traffic requirement is comparatively less strict than the second traffic requirement.

At 1120, the UE may configure the UE to switch from a first antenna subarray operation that uses a first set of antenna subarrays to a second antenna subarray operation that uses a second set of antenna subarrays based at least in part on receiving the indication of the traffic type, wherein the second antenna subarray operation uses a second RF band for a communication. For example, the UE may switch from a first antenna subarray operation to a second antenna subarray operation based at least in part on receiving the indication. The first antenna subarray operation may use a first set of antenna subarrays and the second antenna subarray operation may use a second set of antenna subarrays. In some aspects, the first set of antenna subarrays is a subset of the second set of antenna subarrays. In some aspects, the first set of antenna subarrays is a single antenna subarray.

In some aspects, the second antenna subarray operation uses a second RF band for a communication. In some aspects, the first RF band and the second RF band are a same RF band. In some aspects, the first RF band and the second RF band are different RF bands. In some aspects, the first RF band and the second RF band are overlapping RF bands. In some aspects, the first RF band is a sub-6 GHz band and the second RF band is a millimeter wave band. In some aspects, the first RF band is a first millimeter wave band and the second RF band is a second millimeter wave band. In some aspects, the first millimeter wave band and the second millimeter wave band are the same millimeter wave band.

In some aspects, the first set of antenna subarrays is configured with a first beamforming parameter for the first antenna subarray operation, and the UE may configure a second beamforming parameter of the second set of antenna subarrays for the second antenna subarray operation. In some aspects, the second beamforming parameter causes a second beamwidth that is wider than a first beamwidth caused by the first beamforming parameter. In some aspects, the second beamforming parameter causes a pseudo-omnidirectional antenna pattern.

At 1130, the UE may transmit the communication using the second antenna subarray operation. For example, the UE may transmit the communication using one or more antenna subarrays that are active for the second antenna subarray operation. Additionally, or alternatively, the UE may transmit the communication via the second RF band.

Although FIG. 11 shows example blocks of a method of wireless communication, in some aspects, the method may include additional blocks, fewer blocks, different blocks, or differently arranged blocks than those shown in FIG. 11. Additionally, or alternatively, two or more blocks shown in FIG. 11 may be performed in parallel.

Figure 12:
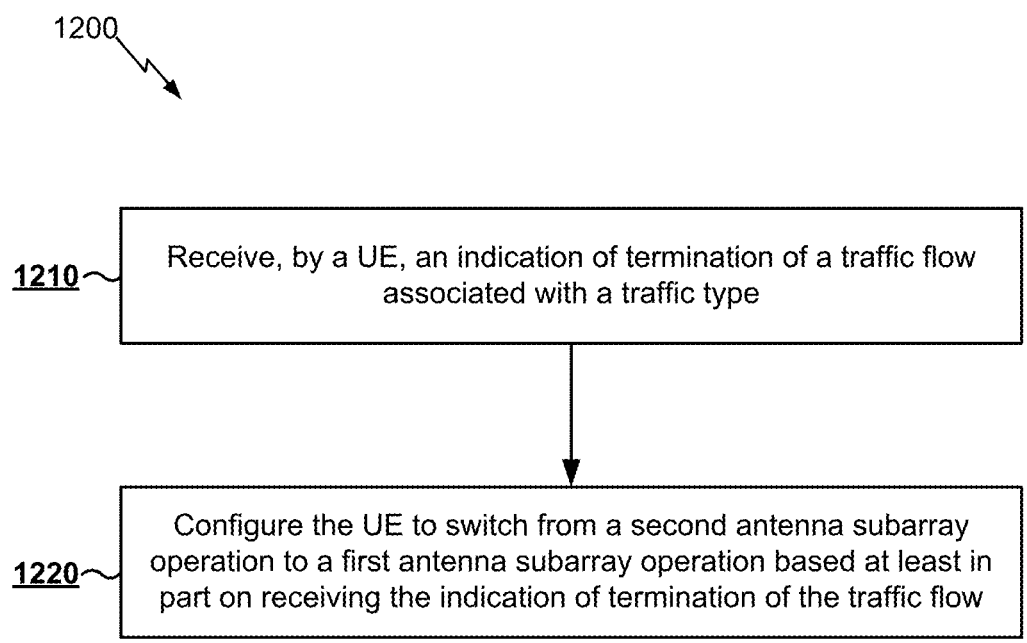
FIG. 12 is a flow chart of another method of wireless communication.

FIG. 12 is a flow chart of a method 1200 of wireless communication. The method may be performed by a UE (e.g., the UE 120 of FIG. 1, the UE 905 of FIGS. 9A-9C, the UE 1005 of FIG. 10, the apparatus 1302/1302', and/or the like).

At 1210, the UE may receive an indication of termination of a traffic flow associated with a traffic type. For example, the UE may receive an indication of termination of a traffic flow associated with a traffic type. In some aspects, the UE may receive the indication from a base station. Additionally, or alternatively, the indication may include a control message instructing the UE to switch from the second antenna subarray operation to the first antenna subarray operation.

In some aspects, the UE may receive the indication from a processor of the UE, and may transmit, to a base station, a request to switch from the second antenna subarray operation to the first antenna subarray operation. In some aspects, the request is transmitted using the first antenna subarray operation. In some aspects, the request is transmitted using the second antenna subarray operation.

In some aspects, the traffic type is associated with a first traffic requirement that has comparatively different strictness than a second traffic requirement associated with another traffic type associated with the first antenna subarray operation. In some aspects, the traffic type is URLLC traffic, and the first traffic requirement is comparatively stricter than the second traffic requirement. In some aspects, the traffic type is eMBB traffic, and the first traffic requirement is comparatively less strict than the second traffic requirement.

At 1220, the UE may configure the UE to switch from a second antenna subarray operation to a first antenna subarray operation based at least in part on receiving the indication of termination of the traffic flow. For example, the UE may switch from a second antenna subarray operation to a first antenna subarray operation based at least in part on receiving the indication of termination of the traffic flow associated with the traffic type.

In some aspects, the second set of antenna subarrays is configured with a second beamforming parameter for the second antenna subarray operation, and the UE may configure a first beamforming parameter of the first set of antenna subarrays for the first antenna subarray operation. In some aspects, the first beamforming parameter causes a first beamwidth that is narrower than a second beamwidth caused by the second beamforming parameter.

Although FIG. 12 shows example blocks of a method of wireless communication, in some aspects, the method may include additional blocks, fewer blocks, different blocks, or differently arranged blocks than those shown in FIG. 12. Additionally, or alternatively, two or more blocks shown in FIG. 12 may be performed in parallel.

Figure 13:
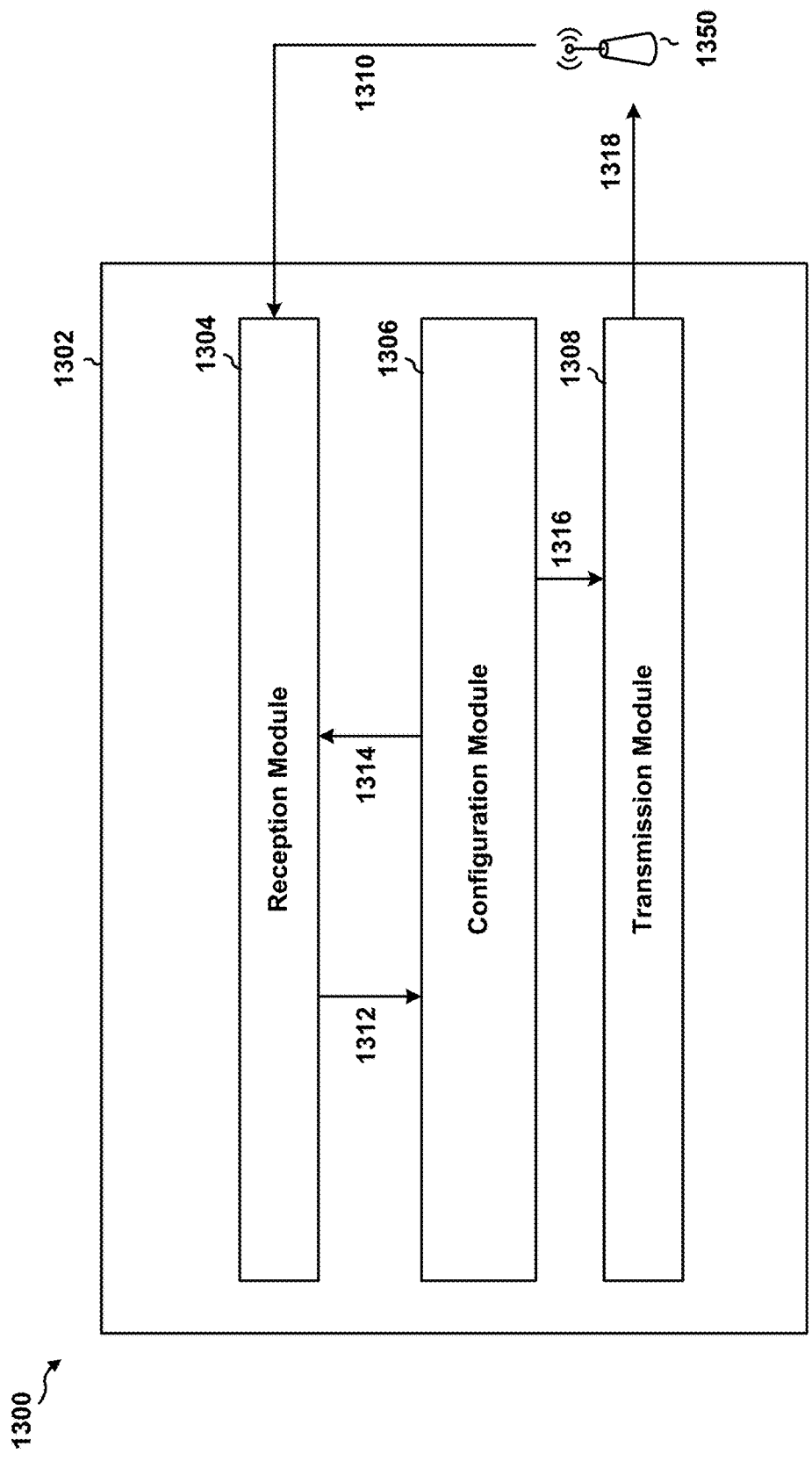
FIG. 13 is a conceptual data flow diagram illustrating the data flow between different modules/means/components in an example apparatus.

FIG. 13 is a conceptual data flow diagram 1300 illustrating the data flow between different modules/means/components in an example apparatus 1302. The apparatus 1302 may be a UE (e.g., the UE 120 of FIG. 1, the UE 905 of FIGS. 9A-9C, the UE 1005 of FIG. 10, and/or the like). In some aspects, the apparatus 1302 includes a reception module 1304, a configuration module 1306, and/or a transmission module 1308.

The reception module 1304 may receive a first indication of a traffic type and/or a second indication of termination of a traffic flow associated with the traffic type. For example, the reception module 1304 may receive data 1310 from a base station 1350, and the data 1310 may include the first indication or the second indication (e.g., in a control message). Additionally, or alternatively, the reception module 1304 may receive the first indication or the second indication from a processor of the apparatus 1302. The reception module 1304 may provide the first indication or the second indication to the configuration module 1306 as data 1312.

The configuration module 1306 may receive the data 1312 from the reception module 1304, and may configure the apparatus 1302 based at least in part on receiving the data 1312. For example, the configuration module 1306 may configure the apparatus 1302 to switch from a first antenna subarray operation that uses a first set of antenna subarrays to a second antenna subarray operation that uses a second set of antenna subarrays based at least in part on receiving the first indication or the second indication (e.g., in the data 1312). In some aspects, the configuration module 1306 may provide data 1314 to the reception module 1304 to configure the switch, and/or may provide data 1316 to the transmission module 1308 to configure the switch.

For example, the reception module 1304 may include one or more antenna subarrays and/or one or more Rx chains, which may be activated or deactivated based on receiving the data 1314. Similarly, the transmission module 1308 may include one or more antenna subarrays and/or one or more Tx chains, which may be activated or deactivated based on receiving the data 1316. Additionally, or alternatively, the transmission module 1308 may provide data 1318 to the base station 1350, which may include a request to switch from a first antenna subarray operation to a second antenna subarray operation.

The apparatus may include additional modules that perform each of the blocks of the algorithm in the aforementioned flow chart of FIGS. 11 and/or 12. As such, each block in the aforementioned flow chart of FIGS. 11 and/or 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 13 are provided as an example. In practice, there may be additional modules, fewer modules, different modules, or differently arranged modules than those shown in FIG. 13. Furthermore, two or more modules shown in FIG. 13 may be implemented within a single module, or a single module shown in FIG. 13 may be implemented as multiple, distributed modules. Additionally, or alternatively, a set of modules (e.g., one or more modules) shown in FIG. 13 may perform one or more functions described as being performed by another set of modules shown in FIG. 13.

Figure 14:
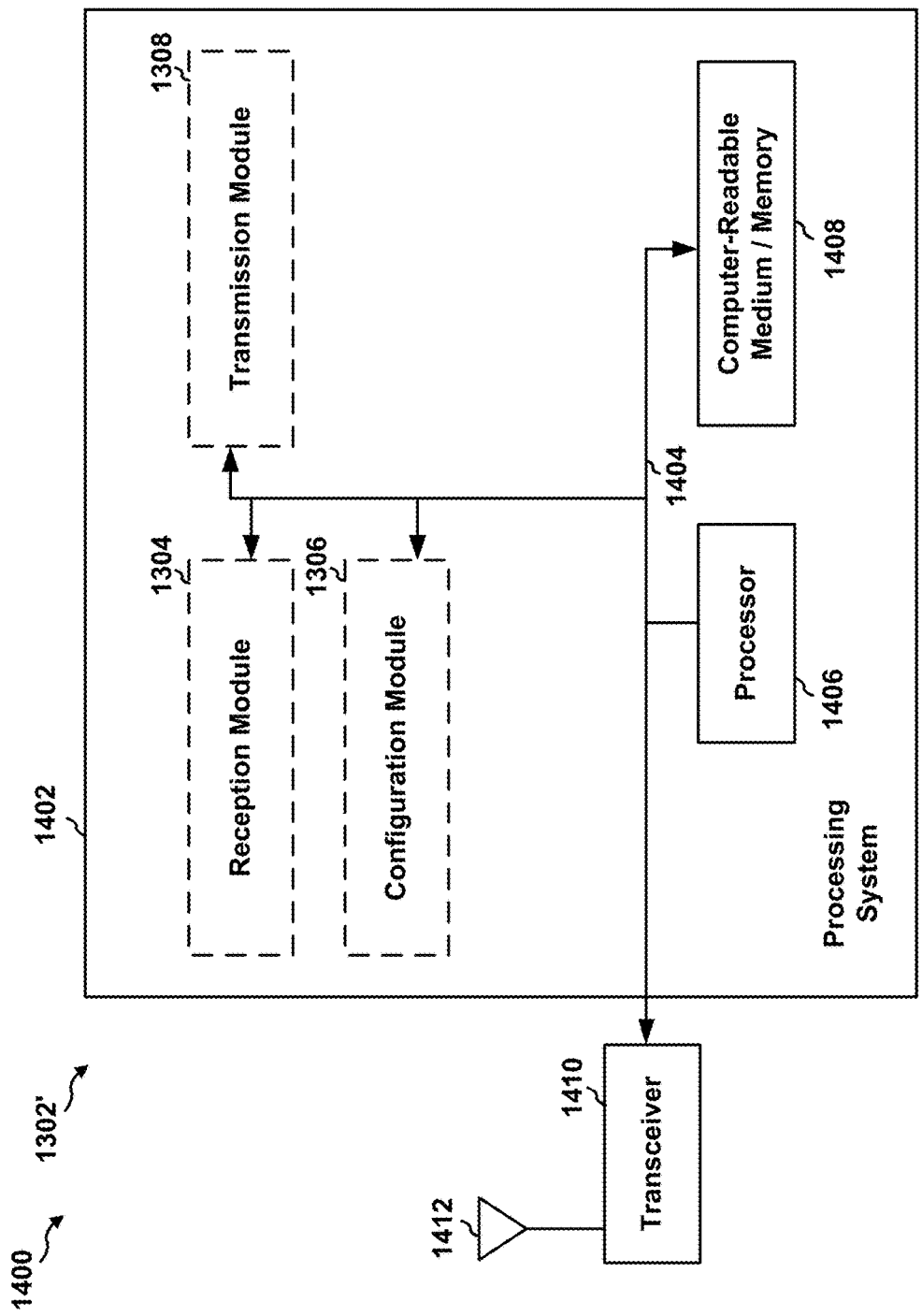
FIG. 14 is a diagram illustrating an example of a hardware implementation for an apparatus employing a processing system.

FIG. 14 is a diagram 1400 illustrating an example of a hardware implementation for an apparatus 1302' employing a processing system 1402. The apparatus 1302' may be a UE (e.g., the UE 120 of FIG. 1, the UE 905 of FIGS. 9A-9C, the UE 1005 of FIG. 10, and/or the like).

The processing system 1402 may be implemented with a bus architecture, represented generally by the bus 1404. The bus 1404 may include any number of interconnecting buses and bridges depending on the specific application of the processing system 1402 and the overall design constraints. The bus 1404 links together various circuits including one or more processors and/or hardware modules, represented by the processor 1406, the modules 1304, 1306, 1308, and the computer-readable medium/memory 1408. The bus 1404 may also link various other circuits such as timing sources, peripherals, voltage regulators, and power management circuits, which are well known in the art, and therefore, will not be described any further.

The processing system 1402 may be coupled to a transceiver 1410. The transceiver 1410 is coupled to one or more antennas 1412. The transceiver 1410 provides a means for communicating with various other apparatus over a transmission medium. The transceiver 1410 receives a signal from the one or more antennas 1412, extracts information from the received signal, and provides the extracted information to the processing system 1402, specifically the reception module 1304. In addition, the transceiver 1410 receives information from the processing system 1402, specifically the transmission module 1308, and based at least in part on the received information, generates a signal to be applied to the one or more antennas 1412. The processing system 1402 includes a processor 1406 coupled to a computer-readable medium/memory 1408. The processor 1406 is responsible for general processing, including the execution of software stored on the computer-readable medium/memory 1408. The software, when executed by the processor 1406, causes the processing system 1402 to perform the various functions described supra for any particular apparatus. The computer-readable medium/memory 1408 may also be used for storing data that is manipulated by the processor 1406 when executing software. The processing system further includes at least one of the modules 1304, 1306, and/or 1308. The modules may be software modules running in the processor 1406, resident/stored in the computer readable medium/memory 1408, one or more hardware modules coupled to the processor 1406, or some combination thereof. The processing system 1402 may be a component of the UE 120 and may include the memory 282 and/or at least one of the TX MIMO processor 266, the RX processor 258, and/or the controller/processor 280.

In some aspects, the apparatus 1302/1302' for wireless communication includes means for receiving an indication of a traffic type, means for configuring the UE to switch from a first antenna subarray operation to a second antenna subarray operation, means for transmitting a communication using the second antenna subarray operation, means for receiving an indication of termination of a traffic flow, and/or means for configuring the UE to switch from the second antenna subarray operation to the first antenna subarray operation. The aforementioned means may be one or more of the aforementioned modules of the apparatus 1302 and/or the processing system 1402 of the apparatus 1302' configured to perform the functions recited by the aforementioned means. As described supra, the processing system 1402 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

The number and arrangement of modules shown in FIG. 14 are provided as an example. In practice, there may be additional modules, fewer modules, different modules, or differently arranged modules than those shown in FIG. 14. Furthermore, two or more modules shown in FIG. 14 may be implemented within a single module, or a single module shown in FIG. 14 may be implemented as multiple, distributed modules. Additionally, or alternatively, a set of modules (e.g., one or more modules) shown in FIG. 14 may perform one or more functions described as being performed by another set of modules shown in FIG. 14.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
receiving, by a user equipment (UE), an indication of a traffic type, wherein the indication is received via a radiofrequency (RF) band;
configuring the UE to switch from a first antenna subarray operation that uses a first set of antenna subarrays to a second antenna subarray operation that uses a second set of antenna subarrays based at least in part on receiving the indication of the traffic type, wherein the second antenna subarray operation uses a same RF band, for a communication, that is used to receive the indication of the traffic type; and
transmitting, by the UE, the communication using the second antenna subarray operation.

2. The method of claim 1, wherein the first set of antenna subarrays is a subset of the second set of antenna subarrays, and
wherein the second set of antenna subarrays includes a greater quantity of antenna subarrays than the first set of antenna subarrays.

3. The method of claim 1, wherein the first set of antenna subarrays is a single antenna subarray.

4. The method of claim 1, wherein the indication of the traffic type is received from a base station, and wherein the indication includes a control message instructing the UE to switch from the first antenna subarray operation to the second antenna subarray operation.

5. The method of claim 1, wherein the indication of the traffic type is received from a processor of the UE, and wherein the method further comprises transmitting, to a base station, a request to switch from the first antenna subarray operation to the second antenna subarray operation.

6. The method of claim 5, wherein the request is transmitted using the first antenna subarray operation.

7. The method of claim 5, wherein the request is transmitted using the second antenna subarray operation.

8. The method of claim 1, further comprising:
receiving an indication of termination of a traffic flow associated with the traffic type; and
configuring the UE to switch from the second antenna subarray operation to the first antenna subarray operation based at least in part on receiving the indication of termination of the traffic flow.

9. The method of claim 1, wherein the traffic type that triggers the second antenna subarray operation is associated with a first traffic requirement that has comparatively different strictness than a second traffic requirement associated with another traffic type associated with the first antenna subarray operation.

10. The method of claim 9, wherein the traffic type is ultra-reliable low-latency communication (URLLC) traffic, and the first traffic requirement is comparatively stricter than the second traffic requirement.

11. The method of claim 1, wherein the traffic type is enhanced mobile broadband (eMBB) traffic.

12. The method of claim 1, wherein the RF band is a sub-6 gigahertz (GHz) band.

13. The method of claim 1, wherein the RF band is a millimeter wave band.

14. The method of claim 1, wherein the first set of antenna subarrays is configured with a first beamforming parameter for the first antenna subarray operation; and
wherein configuring the UE comprises configuring a second beamforming parameter of the second set of antenna subarrays for the second antenna subarray operation.

15. The method of claim 14, wherein the second beamforming parameter causes a second beamwidth that is wider than a first beamwidth caused by the first beamforming parameter.

16. The method of claim 14, wherein the second beamforming parameter causes a pseudo-omnidirectional antenna pattern.

17. The method of claim 1, wherein the second set of antenna subarrays includes a greater quantity of antenna subarrays than the first set of antenna subarrays.

18. A user equipment (UE) for wireless communication, comprising:
a memory; and
one or more processors operatively coupled to the memory, the memory and the one or more processors configured to:
receive an indication of a traffic type, wherein the indication is received via a radiofrequency (RF) band;
configure the UE to switch from a first antenna subarray operation that uses a first set of antenna subarrays to a second antenna subarray operation that uses a second set of antenna subarrays based at least in part on receiving the indication of the traffic type, wherein the second antenna subarray operation uses a same RF band, for a communication, that is used to receive the indication of the traffic type; and
transmit the communication using the second antenna subarray operation.

19. The UE of claim 18, wherein the first set of antenna subarrays is a subset of the second set of antenna subarrays.

20. The UE of claim 18, wherein the first set of antenna subarrays is a single antenna subarray.

21. The UE of claim 18, wherein the indication of the traffic type is received from a base station, and wherein the indication includes a control message instructing the UE to switch from the first antenna subarray operation to the second antenna subarray operation.

22. The UE of claim 18, wherein the indication of the traffic type is received from a processor of the UE, and wherein the UE transmits, to a base station, a request to switch from the first antenna subarray operation to the second antenna subarray operation.

23. The UE of claim 17, wherein the request is transmitted using at least one of the first antenna subarray operation or the second antenna subarray operation.

24. The UE of claim 18, wherein the traffic type is at least one of ultra-reliable low-latency communication (URLLC) traffic or enhanced mobile broadband (eMBB) traffic.

25. The UE of claim 18, wherein the first set of antenna subarrays is configured with a first beamforming parameter for the first antenna subarray operation; and
wherein the one or more processors, when configuring the UE, are to configure a second beamforming parameter of the second set of antenna subarrays for the second antenna subarray operation.

26. The UE of claim 25, wherein the second beamforming parameter causes a second beamwidth that is wider than a first beamwidth caused by the first beamforming parameter.

27. The UE of claim 18, wherein the second set of antenna subarrays includes a greater quantity of antenna subarrays than the first set of antenna subarrays.

28. An apparatus for wireless communication, comprising:
means for receiving an indication of a traffic type, wherein the indication is received via a radiofrequency (RF) band;
means for configuring the apparatus to switch from a first antenna subarray operation that uses a first set of antenna subarrays to a second antenna subarray operation that uses a second set of antenna subarrays based at least in part on receiving the indication of the traffic type, wherein the second antenna subarray operation uses a same RF band, for a communication, that is used to receive the indication of the traffic type; and
means for transmitting the communication using the second antenna subarray operation.

29. A non-transitory computer-readable medium storing instructions for wireless communication, the instructions comprising:
one or more instructions that, when executed by one or more processors, cause the one or more processors to:
receive an indication of a traffic type, wherein the indication is received via a radiofrequency (RF) band;
configure a user equipment (UE) to switch from a first antenna subarray operation that uses a first set of antenna subarrays to a second antenna subarray operation that uses a second set of antenna subarrays based at least in part on receiving the indication of the traffic type, wherein the second antenna subarray operation uses a same RF band for, a communication, that is used to receive the indication of the traffic type; and
transmit the communication using the second antenna subarray operation.

30. The apparatus of claim 28, wherein the second set of antenna subarrays includes a greater quantity of antenna subarrays than the first set of antenna subarrays.

* * * * *